United States Patent
Guion

(10) Patent No.: US 6,726,108 B1
(45) Date of Patent: Apr. 27, 2004

(54) DEVICE FOR LIMITING FRAUD IN AN INTEGRATED CIRCUIT CARD

(75) Inventor: Christian A. Guion, Verrières (FR)

(73) Assignee: Schlumberger Systemes (FR)

( * ) Notice: Subject to any disclaimer, the term of this patent is extended or adjusted under 35 U.S.C. 154(b) by 0 days.

(21) Appl. No.: 09/856,191

(22) PCT Filed: Nov. 4, 1999

(86) PCT No.: PCT/FR99/02690
§ 371 (c)(1),
(2), (4) Date: Aug. 13, 2001

(87) PCT Pub. No.: WO00/30047
PCT Pub. Date: May 25, 2000

(30) Foreign Application Priority Data

Nov. 17, 1998 (FR) .............................................. 98 14409

(51) Int. Cl.$^7$ .............................................. G06K 19/06
(52) U.S. Cl. ............................ 235/492; 235/382; 902/1
(58) Field of Search ................................ 235/492, 382, 235/491, 379, 380, 375, 384; 902/1

(56) References Cited

U.S. PATENT DOCUMENTS

| 4,109,312 A | * | 8/1978 | Beutel ........................ 700/279 |
|---|---|---|---|
| 4,879,645 A | | 11/1989 | Tamada et al. .............. 364/200 |
| 5,550,919 A | | 8/1996 | Kowalski ...................... 380/23 |
| 5,640,003 A | * | 6/1997 | Makino ........................ 235/491 |
| 2002/0124183 A1 | * | 9/2002 | Marinet et al. .............. 713/200 |

FOREIGN PATENT DOCUMENTS

FR  2 716 021  8/1995  ......... G06K/19/073

OTHER PUBLICATIONS

IBM Technical Disclosure Bulletin, Touch Control Digital Monitor, Jun. 1993, Issue 6A, vol. 36, pp. 517–520.*

* cited by examiner

Primary Examiner—Michael G. Lee
Assistant Examiner—Kimberly Nguyen
(74) Attorney, Agent, or Firm—Osha Novak & May L.L. P.

(57) ABSTRACT

An integrated circuit device has a memory area that includes a data memory. The data memory has a counter element and an indicator element. The counter element counts at least one number of occurrences of events within the device. When the counter element reaches a threshold value, which is indicative of a large maximum number of occurrences of the events, the indicator element goes from a first state to a second state.

9 Claims, 3 Drawing Sheets

DEVICE FOR LIMITING FRAUD IN AN INTEGRATED CIRCUIT CARD

FIELD

The present invention relates to an integrated circuit device having a memory area comprising a data memory.

BACKGROUND

Such integrated circuit devices are widely used in applications where information processing security is essential. In particular, these are integrated circuit cards including applications relating to the fields of health, mobile telephony, or also banking applications.

An integrated circuit card is composed of a plastic card body which incorporates an electronic unit. This card communicates with a terminal, for example a mobile telephone, a banking terminal or also a computer, through a communications network and is able to send messages containing encrypted information to said terminal through the network so as to make information transfers secure. In everyday language, the message is said to be signed. For computing encrypted information, the card employs a secret coding key which is located within the data memory of its memory area and an encryption algorithm.

Although information transfers are thus made secure, an integrated circuit card remains vulnerable since a forger could perform many actions on the card which would allow him or her to uncover its secrets. Thus, said forger, wishing to find the coding key, could for example send a signature instruction message to the card and keep a record of the signals generated when executing said instruction. Thereafter, he or she could send a large number of signature instructions for the same message, expose the card to electromagnetic perturbations at specific time points during the progress of said algorithm and keep records of the various emitted signals. By matching records of signals obtained during perturbations with the first record, forgers can analyze differences or the absence of differences between the various obtained encrypted pieces of information in order to uncover a cod key portion. Thus, in spite of the secure information transfer performed by the card, forgers can still access confidential information by performing a very large number of actions on the integrated circuit card.

Thus, a technical problem to be solved by the present invention is to provide an integrated circuit device having a memory area comprising a data memory, which device would allow the card to become more secure by restricting the number of forgery actions that can be performed on the card.

SUMMARY

According to the present invention, a solution to the technical problem posed is such that the data memory contains at least one counter element, and at least one threshold value, which counter element, on the one hand, counts at least one number of event occurrences within said device, and, on the other hand, is likely to reach said threshold value which is indicative of a large maximum number of occurrences of said events, wherein the data memory comprises at least two indicator elements residing at non-contiguous locations within the data memory, said indicator elements being associated with said counter element and said indicator element being designed to go from a first state to a second state when said counter element has reached said threshold value.

Thus, as explained in detail below, the device according to the invention enables to restrict the number of possible actions or events performed on said integrated circuit card, on the one hand, by means of a counter element which will count the number of actions performed taking into account an action or a group of actions, and, on the other hand, by means of an indicator element which will indicate that the threshold value of the event or action occurrence number has been reached, so that afterwards, a sanction can be applied the next time said threshold value is exceeded.

Other features and advantages of the invention will become apparent in the following description of preferred embodiments of the present invention, provided by way of non-limiting examples, in reference to the appended figures.

DETAILED DESCRIPTION OF THE INVENTION

Figure 1:
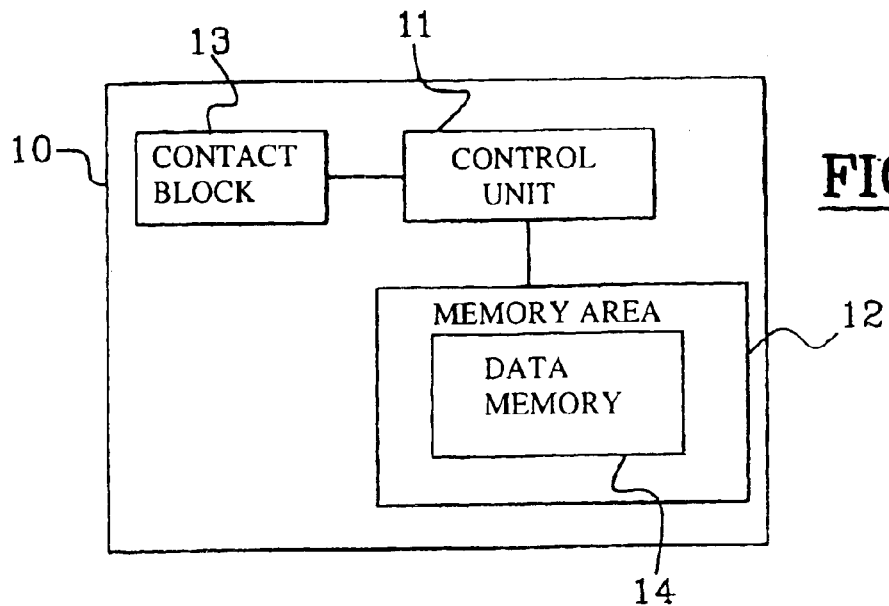
FIG. 1 is a schematic diagram of an integrated circuit device according to the invention, here an integrated circuit card.

FIG. 1 shows an integrated device 10 which, in the disclosed embodiment, is an integrated circuit card.

Card 10 has a control unit 11 (such as a central processor unit or CPU), a memory area 12 having a data memory 14 and a contact block 13, for electrical connection, for instance to a card-reader connector.

Figure 2:
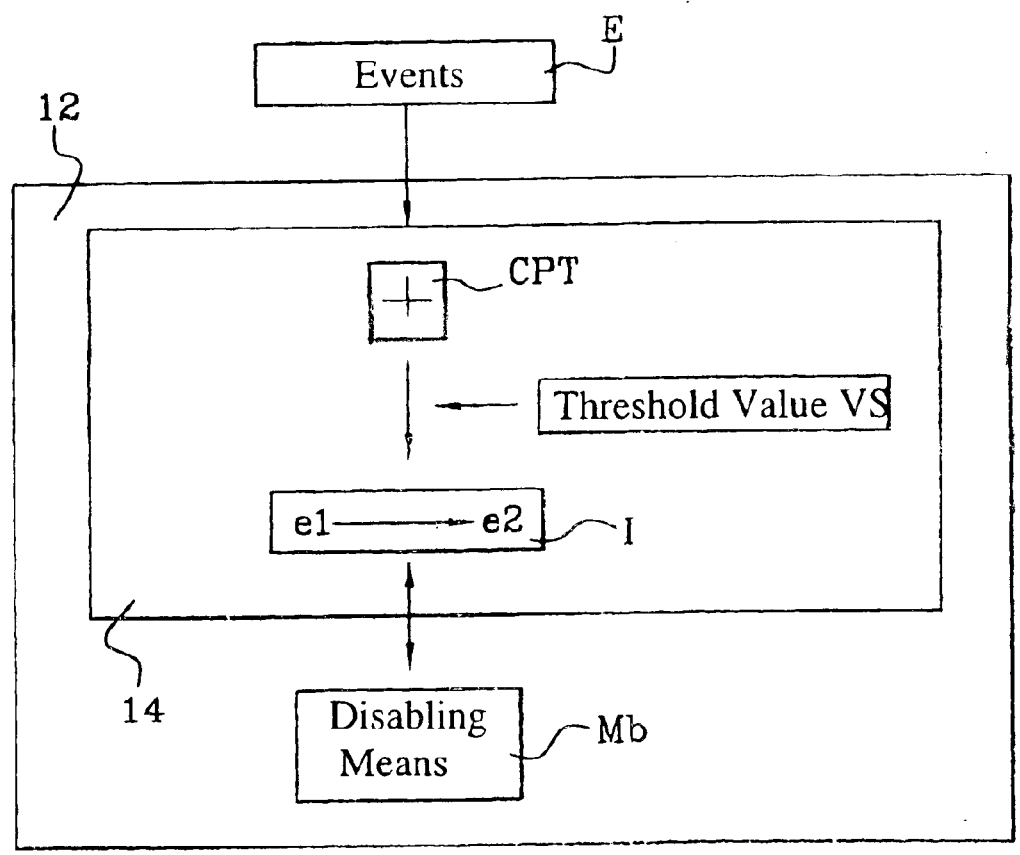
FIG. 2 is a schematic diagram showing a memory area in the card of FIG. 1 according to the invention.

Memory area 12 is shown in FIG. 2. It has a counter element CPT, a threshold value VS, and an indicator element I as well as disabling means Mb, said indicator element being designed for going from a first state e1 to a second state e2 when the counter element has reached said threshold value. While the card is being used, several events can occur, an event being an action which occurs within said device and leads to some result, for which a mean occurrence number can be determined while the device is being used. Thus, for example, a power-on is an event in response to which the card will send a message, often called "the reply-to-reset message". The sending of a signed message is also an event.

While a card is being used, for a particular application, the mean number of events that can occur, for example of the type "send signed message", can be determined. Thus, for banking applications, over a two-year period which is typical of a credit card's life span, there will be an average of three hundred signed messages for a card belonging to a user who employs the card about three times a week, and six hundred for a user who uses it about five times a week.

In FIG. 2, a counter element CPT counts at least one number of event occurrences in the card, for example the signed message occurrence number. The counter element may reach the threshold value VS, which is indicative of a large maximum number of occurrences of said events. In the case when the integrated circuit card comprises a read only memory (ROM), an erasable and programmable read only memory (EPROM) and an electrically erasable programmable read only memory (EEPROM), the threshold value VS, since it is fixed, can reside within one of the three memories, wherein said memories, according to the present disclosure, are a data memory, whereas the counter and indicator elements will reside within a PROM, since their value can vary.

According to the invention, the threshold value represents an unlikely number of occurrences of such events which occur within said device when normally used. In order to detect fraudulent usage of the device, this maximum number of event occurrences is chosen to be large since it represents the number of unlikely event occurrences, and therefore, this large maximum number of event occurrences is greater than about one hundred, and preferably, greater than about one thousand. With such values, different events in different applications can be taken into account. In the aforementioned example, it is known that it is unlikely that two thousand signed message occurrences will occur between the card and a banking terminal. Therefore, in this case, the threshold value will be set to two thousand. If such a case occurs, it is very likely caused by a forger attempting to uncover secrets stored within the card.

Therefore, to prevent forgery, when element CPT has reached threshold value VS, indicator element I goes from a first state e1 to a second state e2, which is also referred to as element I going from a passive state to an active state, and memory area 12 in the device according to the invention further includes means Mb for disabling the operation of said device when an indicator element has gone to the second state e2. Thus, if two thousand occurrences of signed messages have been reached, an element I is enabled and the disabling means Mb, after having checked the state of said element I, disables the card, which can no longer either receive or generate any event of the same nature as the one that has enabled the indicator element, which event, in the present case, is a signed message type of event, or receive any event or take any action whatsoever. In the latter case, the card can no longer be used and is conventionally said to be silent.

According to a first embodiment of the device according to the invention, a counter element is defined for a unique event.

Figure 3:
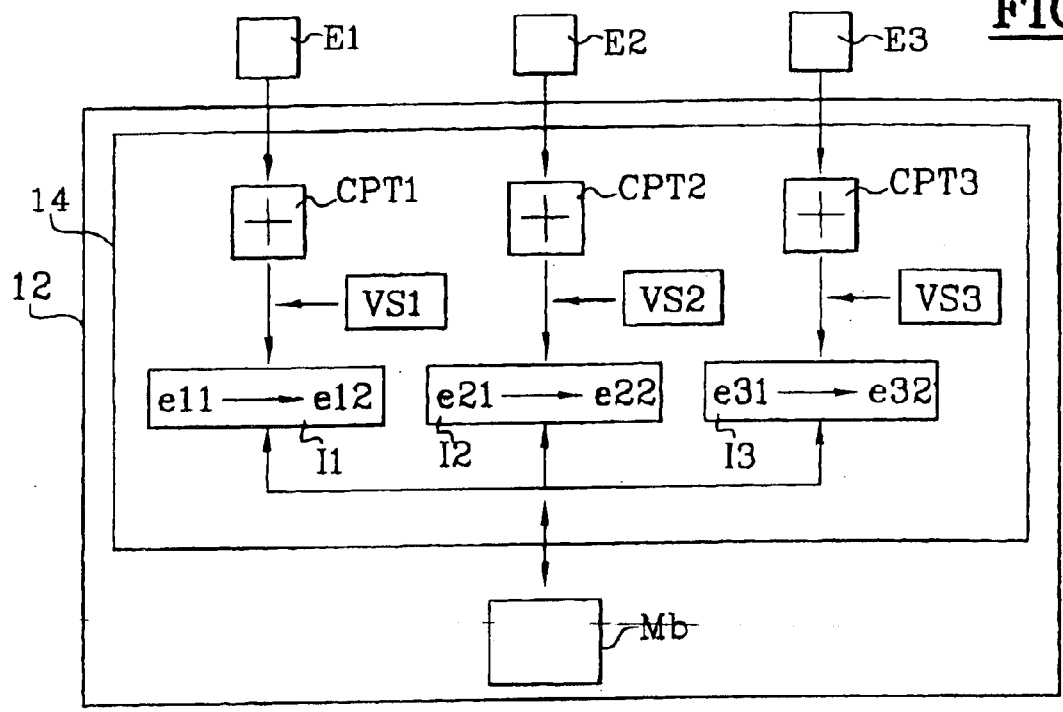
FIG. 3 is a schematic diagram showing the distribution of counter and indicator elements within the memory area of FIG. 2.

Therefore, in FIG. 3, counter element CPT1 is defined for event El, element CPT2, for event E2 and element CPT3, for event E3.

However, although events can be of different nature, their occurrence numbers during the life span of a card can be of the same order of magnitude and therefore their unlikely occurrence numbers can be the same. As a consequence, it may be desired to classify them into the same category. For example, it may be assumed that sending signed messages belongs to the same category as sending encrypted messages. Thus, according to a second embodiment of the device according to the invention, a counter element is defined for at least two events, which events belong to the same category. Thus, according to the schematic diagram shown in FIG. 4, counter elements CPT1 and CPT2 are defined for two event categories (E1, E2, E3) and (E4, E5), respectively.

In both embodiments according to the invention, a threshold value is defined for each counter element. Thus, Values VS1, VS2 and VS3 being associated with each respective event, such as in the case of FIG. 3, is equivalent to values VS1 and VS2 being associated with each respective category of events, such as in FIG. 4. When a element CPT has reached its threshold value VS, indicator elements indicate that the maximum allowed number of event occurrences represented by threshold value VS has been reached.

In both aforementioned embodiments, said indicator elements can be implemented in two different ways.

According to a first variation shown in FIG. 3, in the device according to the invention, at least one indicator element I is defined for a unique counter element CPT. Thus, when counter element CPT1 reaches threshold value VS1, indicator element I1 goes to the second state e12. The disabling means Mb checks the state of element I1 and as soon as the latter has gone to the second state, it disables the card, which is also the case for elements I2 and I3.

Figure 4:
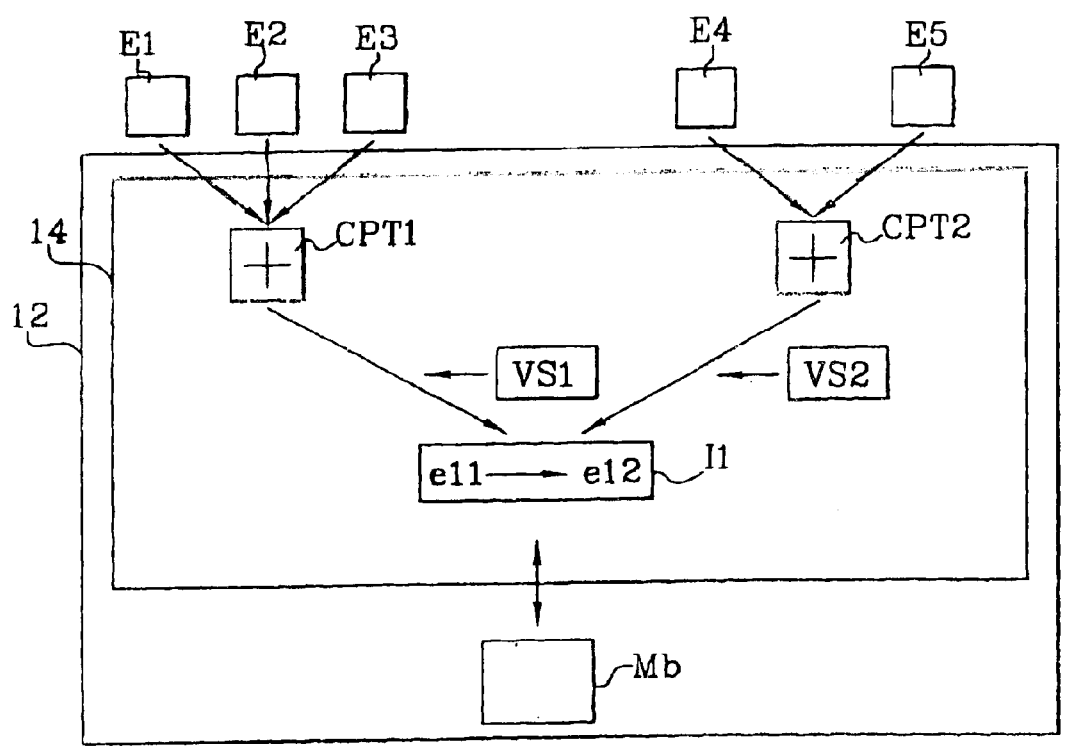
FIG. 4 is a schematic diagram showing another the distribution of counter and indicator elements within the memory area of FIG. 2.

According to a second variation of the embodiment shown in FIG. 4, in the device according to the invention, at least one indicator element I is defined for at least two counter elements CPT. Thus, when one of elements CPT1 and CPT2 reaches its respective threshold value VS1 or VS2, element I1 goes from state e11 to state e12, which indicates that a forgery has taken place and as a consequence, means Mb disables the card.

Thus, according to both embodiments, and to both associated variations, the number of event occurrences within the card and therefore the number of possible actions that can be performed on the card by a forger, are restricted.

However, a forger could modify the state of an indicator element by making it passive if it was previously active, before means Mb can disable the card and therefore could freely continue penetrating card secrets.

Figure 5:
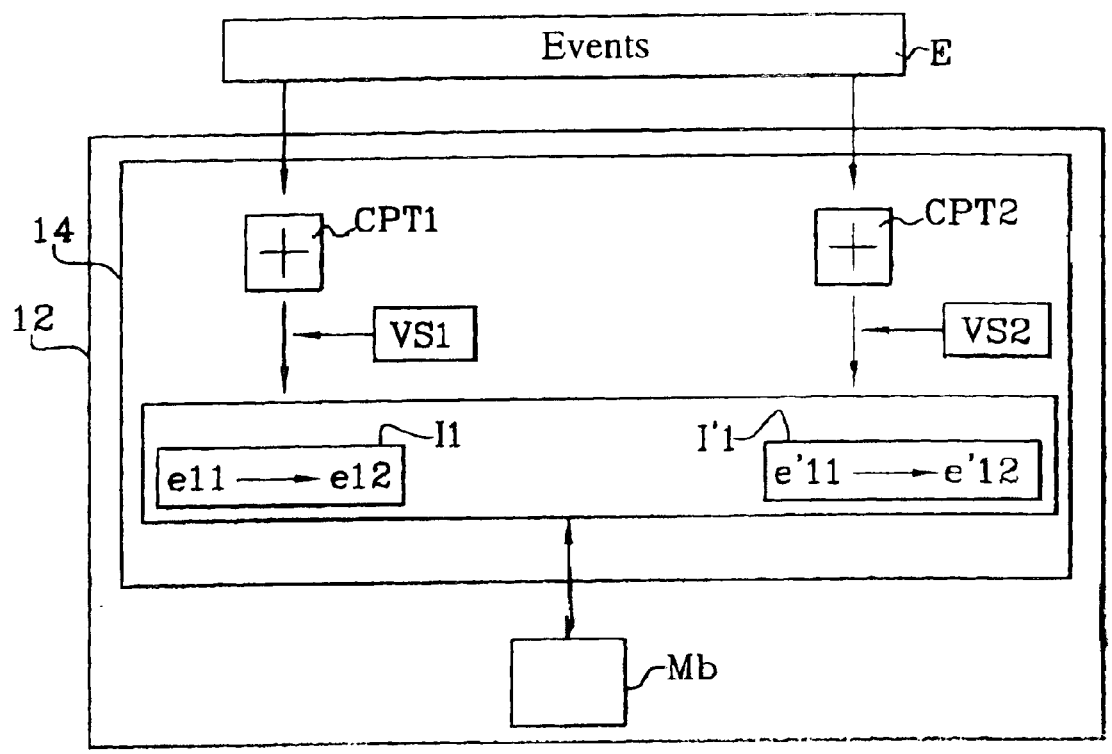
FIG. 5 is a schematic diagram of another embodiment of the invention, wherein the memory area of FIG. 2 has two identical indicator elements.

Thus, the data memory 14 in the device according to the invention has at least two identical indicator elements residing at non-contiguous locations within the data memory, said elements being attached to the same set of counter elements comprising one or more counters according to the variations mentioned above in reference to FIGS. 3 and 4. As shown in FIG. 5, indicator element I'1 is the same as I1 since they are both attached to elements CPT1 and CPT2 and both go from a first state to a second state at the same time when either one of these two counter elements has reached its maximum value. Moreover, the indicator elements reside within data memory 14 in the card at non-contiguous locations, so as to prevent forgery such as modifying the state of all active identical indicator elements, which forgery would be made easier by the elements residing at closely spaced locations. Thus, even if a forger manages to modify the state of one element I by making it passive, other identical indicator elements will remain active because, in such a case, it will be unlikely for said forger to find the location of all identical indicator elements.

On the other hand, in the device according to the invention, disabling means Mb disables the operation of said device when the state of one indicator element is different from that of another identical indicator element. The forger's action can thus be countered.

It should be appreciated that in any case, the values of the first states of indicator elements can be equivalent to, or different from each other. The is also true for the second state values.

Thus, with both embodiments and both variations of the indicator elements, and due to the system using identical indicator elements, the device according to the invention allows the card to be made more secure by restricting the number of possible actions that can be performed on it by a forger.

What is claimed is:

1. An integrated circuit device having a memory area comprising a data memory having at least one counter element and having at least one threshold value, wherein said counter element, on the one hand, counts at least one occurrence number of events occurring within said device and, on the other hand, can reach said threshold value, which is indicative of a large maximum number of occurrences of said events, wherein the data memory comprises at least two indicator elements residing at non-contiguous locations within the data memory, said indicator elements being associated with said counter element and being designed to go from a first state to a second state when said counter element has reached said threshold value.

2. The device according to claim 1, wherein an event is an action occurring within said device which leads to a result and whose mean number of occurrences during the lifetime of said device can be determined.

3. The device according to claim 1, wherein said threshold value represents an unlikely number of occurrences of said events occurring within said device during normal use of said device.

4. The device according to claim 1, wherein a threshold value is defined for each counter element.

5. The device according to claim 1, wherein a counter element is defined for a unique event.

6. The device according to claim 1, wherein a counter element is defined for at least two events.

7. The device according to claim 1, wherein said memory area comprises means for disabling the operation of said device when an indicator element has gone to the second state.

8. The device according to claim 7, wherein disabling means disable the operation of said device when the state of one indicator element is different from the state of another identical indicator element.

9. The device according to claim 1, wherein said large maximum number of event occurrences is greater than about one hundred, and preferably, greater than about one thousand.

* * * * *